July 20, 1937.  R. J. DUNN  2,087,569
GASKET MATERIAL
Filed July 3, 1935
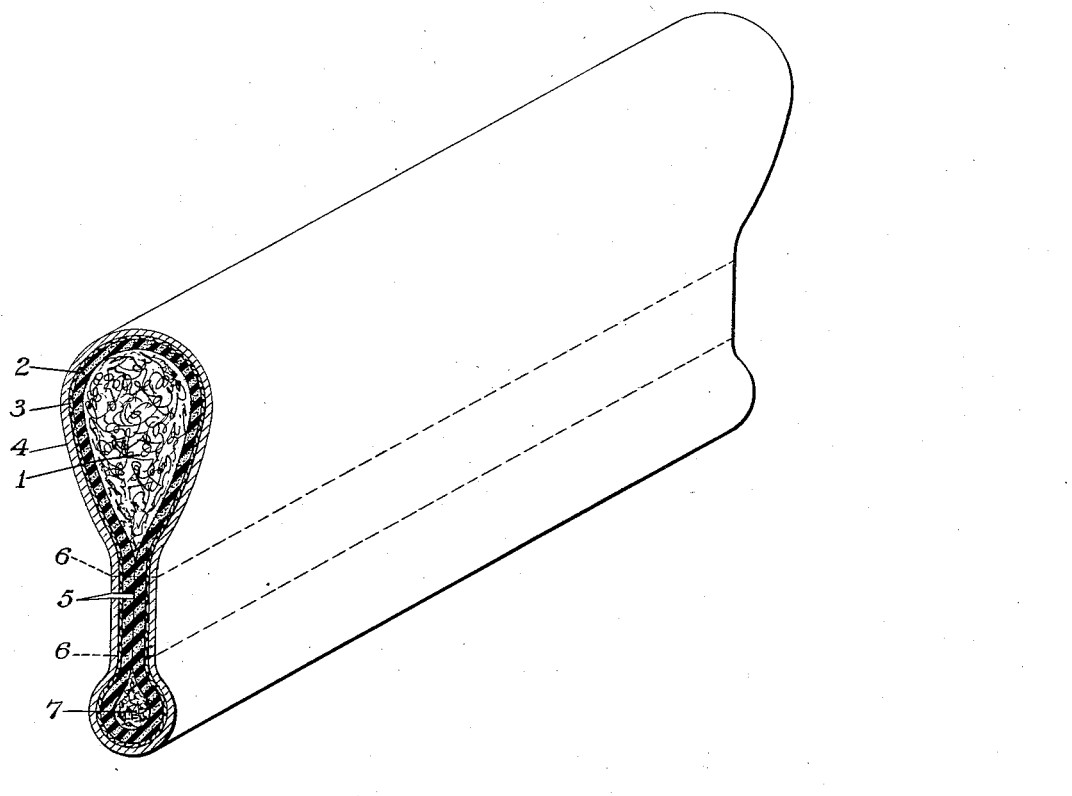
Ralph J. Dunn  INVENTOR.
BY Frank C. Helberg
ATTORNEY Patented July 20, 1937

2,087,569

UNITED STATES PATENT OFFICE 2,087,569

GASKET MATERIAL

Ralph J. Dunn, Fairfield, Conn., assignor to E. I. du Pont de Nemours & Company, Wilmington, Del., a corporation of Delaware Application July 3, 1935, Serial No. 29,608

1 Claim. (Cl. 20—69)

This invention relates to a rubberized fabric for use as a gasket material and more particularly to a rubberized fabric at least one face of which is of a cellular structure so as to impart improved resiliency to the material.

Gaskets and welts used as seals on doors of refrigerators and similar cabinets are usually manufactured from molded or extruded rubber strips or from rubberized fabric which is cut into strips and formed into a suitable welt. Such materials are relatively dense in composition and although the rubber permits of some flexibility, the products do not lend themselves to fabrication of a gasket which possesses and retains a high degree of compressibility in service. Consequently, the prior art leaves much to be desired in the production of an ideal material for use as a gasket.

This invention presents as an object the manufacture of an improved material for use as a gasket or welt.

A further object is the provision of a method of manufacturing a gasket and welt material which possesses a higher degree of compressibility than materials heretofore offered for the purpose.

A still further object is the provision of a method of manufacturing a gasket and welt material which retains to a greater degree its compressibility property when in service.

These objects are accomplished by preparing a rubber composition coated fabric at least one face of which is of a cellular structure rubber composition.

The attached drawing shows in the single figure a perspective view of the finished gasket with the end in section. In the figure, 1 and 7 represent cotton padding; 2 is a sponge rubber layer; 3 a fabric layer; 4 the exterior rubber coating layer; 5 edges of the strip used to prepare the gasket; and 6 is stitching which holds the edges in place and also the cotton padding 1 and 7 in position.

In order to illustrate the invention the following description of a preferred embodiment is given but it is to be understood that the invention is not limited thereby except as defined in the appended claim.

A woven fabric of the sheeting type weighing approximately 5.08 ounces per yard 40 inches in width having a count of 64 x 68 is coated on both sides with a very thin rubber composition dispersion of the dense type according to procedures well known in the art. One side of the fabric is then coated preferably by a calendering operation with a composition having the following formula:

| | Parts by weight |
|---|---|
| Pale crepe rubber | 40 |
| White petrolatum | 1 |
| Zinc oxide | 10 |
| Lithopone | 20 |
| Whiting | 20 |
| Accelerator | 1¼ |
| Sulfur | 1 |

The coated surface is then dusted with corn starch to remove the tackiness and the opposite side then coated preferably by calendering with a cellular structure forming rubber compound having the following formula:

| | Parts by weight |
|---|---|
| Pale crepe rubber | 70 |
| Zinc oxide | 4 |
| Lithopone | 10 |
| White petrolatum | 4 |
| Ammonium bicarbonate | 5 |
| Magnesium carbonate | 10 |
| Accelerator | 2 |
| Sulfur | 1½ |

The total thickness of the material at this stage of the operation is approximately 0.032". The cellular structure forming composition which has been applied to the previously coated fabric is also dusted with corn starch to remove surface tackiness and the material then vulcanized by heating it in a festooning oven to a temperature of 250° F. for 1½ hours. During the vulcanization operation the material increases in thickness due to the cellular structure formed in one of the coatings and after vulcanization is approximately 0.060" thick.

This material is now ready to be made into gaskets of various types or shapes as may be desired or necessary for particular uses. In the drawing is shown a type of gasket which is commonly used. To prepare this material the coated fabric just described is cut into strips two inches in width and passed through a machine which forms it into a welt. The sponge rubber face of the material forms the inner surface of the welt and paddings of cotton are disposed between the overlapped edges of the strip, the edges then being stitched to the center of the strip forming a butt seam. This welt material is made by machines and processes well known in the art so that a further detailed description is unnecessary.

The invention is not limited to the use of any particular weight or construction of fabric, it being evident that the fabric may vary in both construction and weight according to the particular type of product which it is desired to manufacture. In fact, almost any felted or woven fabric suitable for the purpose and which may be rubberized will be found satisfactory.

While in the examples the coatings were noted as being applied by calendering, spreading operations which are well known in the art may be used.

In the compounds listed above, the ingredients may be varied within any limits known to produce satisfactory rubber coatings. The smooth coating may be an acid cured type with a formula as follows:

| | Parts by weight |
|---|---|
| Rubber | 40 |
| White substitute | 10 |
| Lithopone | 20 |
| Petrolatum | 1 |
| Whiting | 30 |

In this case, of course, the sponge coating is applied first and vulcanized by dry heat cure before the smooth coating is applied to the other side of the fabric and then acid cured.

The sponge type compound can vary within the following limits, although any satisfactory sponge compound will fulfill the requirements of the invention.

| | Parts by weight |
|---|---|
| Pale crepe rubber | 40 to 80 |
| Zinc oxide | 4 to 10 |
| Pigment | 0 to 20 |
| Petrolatum | 3 to 8 |
| Ammonium bicarbonate | 4 to 8 |
| Magnesium carbonate | 5 to 20 |
| Accelerator and sulfur | Sufficient to vulcanize |

The accelerator used can be any of the many well known to the rubber industry. Specific examples are mercaptobenzothiazole and tetramethylthiuramdisulfide.

The ratios of sulfur and accelerator are, of course, determined only by vulcanization requirements and are well known to the industry.

Specific examples of rubber compositions are given in the description of the preferred embodiments but it is to be understood that the invention is not to be limited thereto. Variations in the rubber compositions will be readily evident to those skilled in the art and may be made without departing from the general spirit of the invention. Various modifications in the order of steps of coating and vulcanizing the product may be made and such modifications will be readily apparent. For example, the cellular structure forming composition may be applied and vulcanized and then the opposite face of the material coated and the rubber composition cured by either the acid or vapor method. If desired both surfaces of the fabric may be coated with the cellular structure forming composition and the finished material used in this form in the production of gasket or welt material. The surface finishes on the rubber films may be of the varnish type or any other suitable dusting agents may be substituted for the corn starch as noted in the description of a preferred embodiment. Further the thickness of the material may be varied over limits depending upon the needs of the finished material desired.

As previously indicated the invention is of course not restricted to any particular shape or type of finished gasket material since any type may be prepared, its shape and size depending upon the particular application which is to be made of the product.

The invention has been illustrated by a procedure which will produce a white gasket particularly suitable for refrigerators. It is apparent that other colors can be prepared by the addition of appropriate coloring matter. In preparing material for automobile doors black is often used.

The cellular structure forming film of the material is preferably disposed on the inner surface of the gasket although not necessarily so since as previously indicated a material having the cellular structure film on both sides may be used. The padding used in the finished gasket material may be any type of fibrous material such as paper, wool, animal or vegetable fiber in addition to the cotton as noted above.

The product of the invention finds particular use as a gasket material on the doors of refrigerators and other types of cabinets where it is desired to have a secure seal between the door and the main body of the cabinet. Also the material finds particular application where it is desired to have the material retain its resiliency after long and continued service. Other uses of the desirable product of the invention will suggest themselves to those skilled in the art, such as around automobile doors, where they are efficient in maintaining their resiliency, thereby reducing noises, and eliminating drafts especially in cold weather.

The principal advantage of the product of the invention is the improved resiliency of the gasket material.

A further advantage is the retention of this improved resiliency of the material in actual service.

A still further advantage is the reduction in the loss of heat, odors and fumes through the door edges of a refrigerator or other cabinet on which the gasket material is used due to the increased resiliency.

I claim:

A strip gasket comprising bulged edge portions connected by a narrower section, said bulged portions having resilient cores of fibrous material, the gasket comprising an outer rubber surface and an inner sponge rubber surface, said outer and inner surfaces being the coated surfaces of a coated fabric wrapped about the said resilient cores.

RALPH J. DUNN.